July 16, 1957 W. F. SCHEEL 2,799,248
MOTOR SEAL
Filed May 27, 1953 3 Sheets-Sheet 1

INVENTOR
WALTHER F. SCHEEL
BY Strauch, Nolan & Diggins
ATTORNEYS

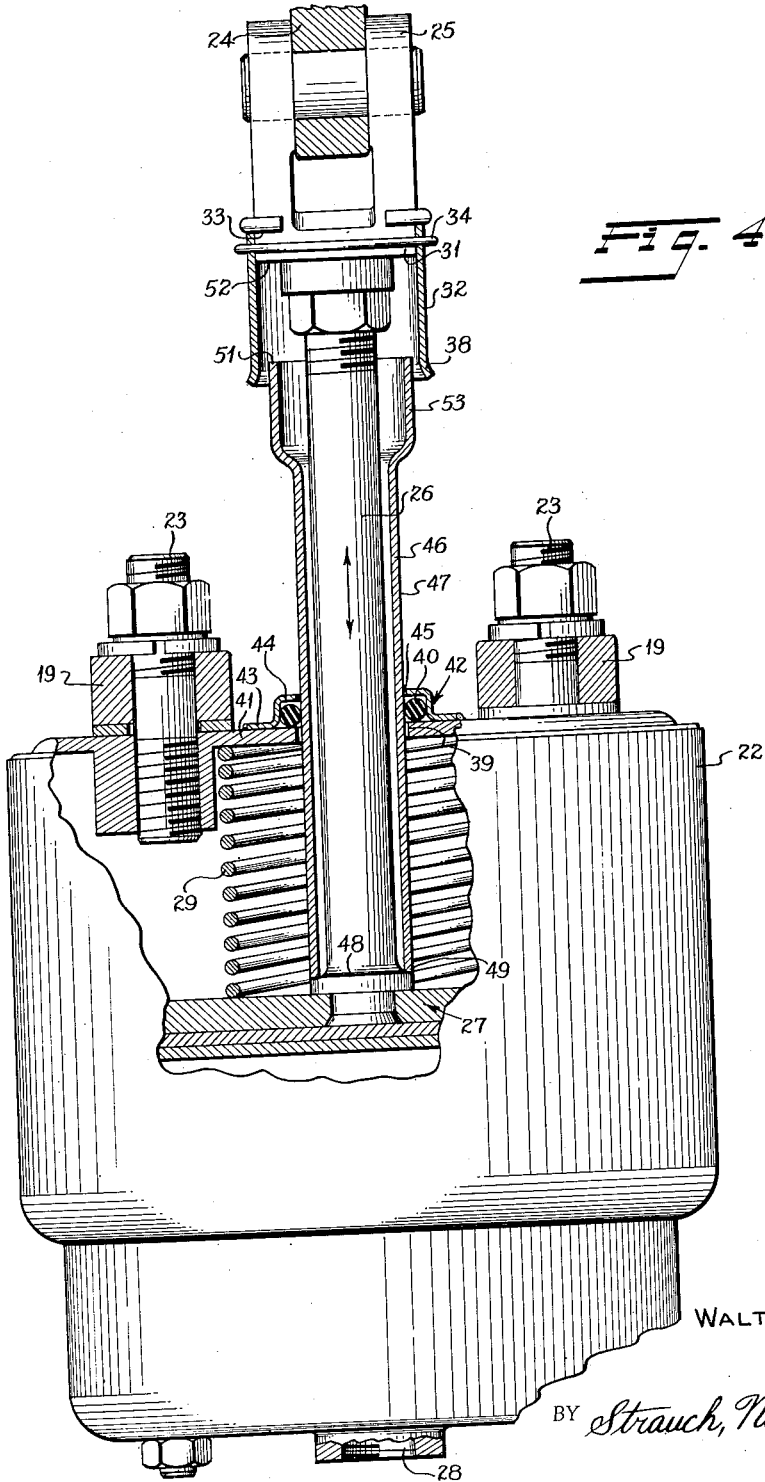

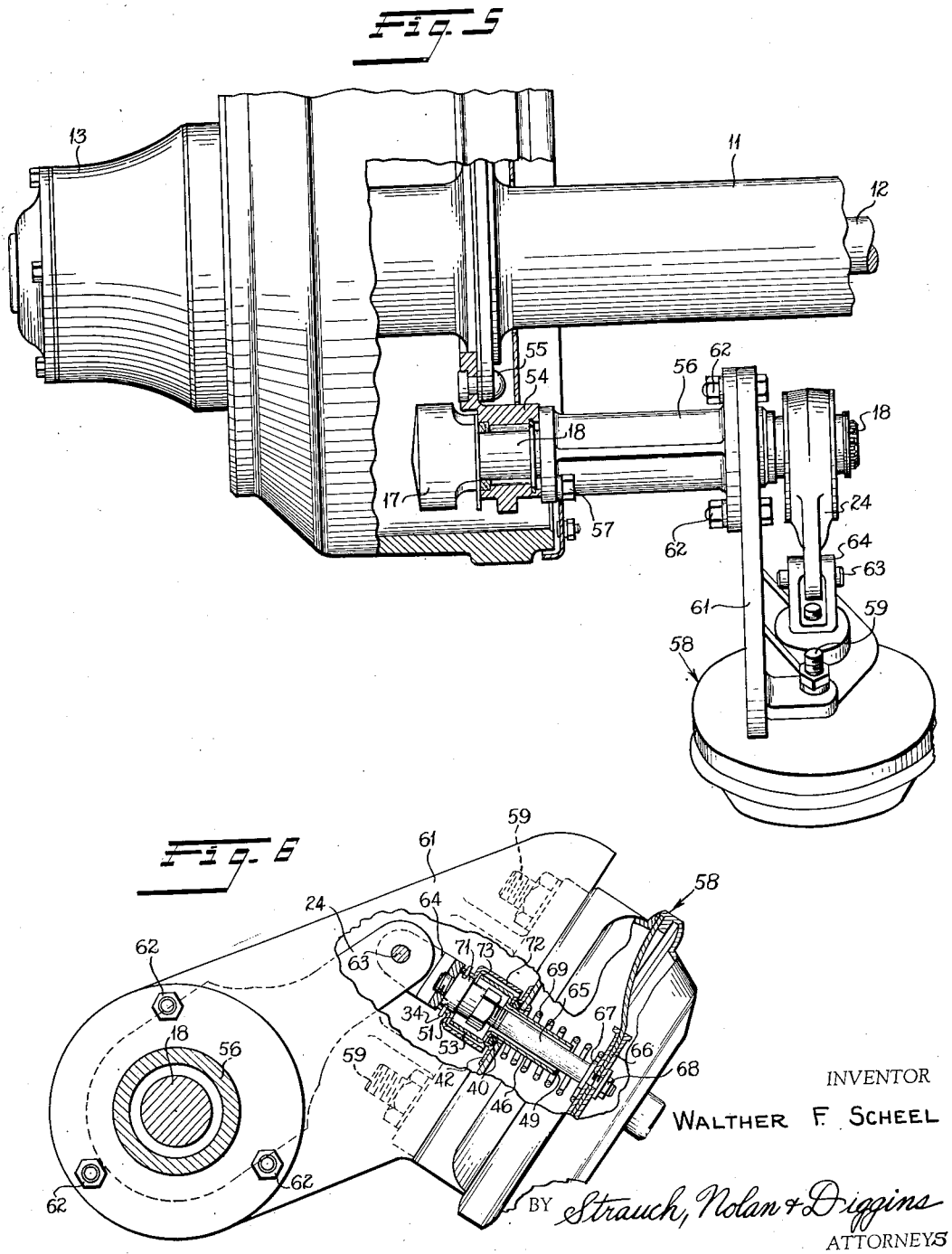

United States Patent Office 2,799,248
Patented July 16, 1957

2,799,248

MOTOR SEAL

Walther F. Scheel, Detroit, Mich., assignor, by mesne assignments, to Rockwell Spring and Axle Company, Coraopolis, Pa., a corporation of Pennsylvania Application May 27, 1953, Serial No. 357,769

12 Claims. (Cl. 121—38)

This invention relates to improvements in vehicle brake mechanisms and is particularly directed to novel seals for brake actuating devices.

In the conventional installation of air brakes it is customary to mount the brake actuating device, such as a diaphragm motor or a piston motor, beneath the vehicle closely adjacent the associated brake assembly. In this position the actuating device is exposed to impact by dirt and gravel, and penetration by dust and all types of foreign matter, as well as the splashing road water thrown up by the wheels of the vehicle. This road water may contain oil, gasoline and other corrosive substances. The useful lives of these devices are materially shortened by such foreign matter and liquids getting into them and causing failure due to wear and corrosion and rust of the operative parts.

The proper sealing of the reciprocable push rod openings in these actuating devices has been a constant problem to those skilled in the art, and heretofore known efforts to efficiently seal these mechanisms have not been completely satisfactory.

A conventional form of seal heretofore employed has been a resilient tubular element, usually known as a rubber boot, which encircles and is secured to a shoulder on the motor housing at one end and is secured to the movable push rod at its other end. This type of seal, though in common use today, has many deficiencies. Most notable is the susceptibility of the rubber boot to cracking after repeated flexing, which susceptibility is further aggravated by cold weather, age hardening, and deterioration by oil and the like. Additionally, road obstructions and sharp flying objects such as stones may cut the boot. The presence of such holes or cracks in the boot readily admit solid foreign material, which soon results in damage to the internal parts, or water and road liquids which cause corrosion or which may freeze in cold weather and burst the boot or prevent proper operation of the brake. The impossibility of finding all of these cracks and ruptures in the boot during the usual periodic inspection on the vehicle and the expense and necessity of replacing defective boots as a periodic safety measure makes such boots unsatisfactory from a practical viewpoint.

The present invention contemplates a simple novel push rod seal means for such brake actuating devices. It comprises telescoped rigid baffle members, preferably of metal, forming an effective seal by providing a tortuous path to the interior of the diaphragms or piston chambers through which it is practically impossible for foreign matter and corrosive liquids to pass, and which will have a useful life substantially equivalent to that of the actuating device itself.

It is therefore a major object of the present invention to provide a simple, inexpensive and novel push rod seal for vehicle brake actuating devices.

Another object of this invention is to provide an efficient non-flexing push rod seal for vehicle brake actuating devices.

A further object of this invention is to provide a vehicle brake motor having a push rod seal composed of substantially the same material as the mechanism casing to thereby have a useful life equivalent to the brake mechanism.

Still another object of this invention is to provide a push rod seal for a brake actuating motor wherein the seal is composed of a plurality of telescoped elements which provide a tortuous path to the interior of the brake mechanism, to effectively prevent the passage of foreign matter into the brake mechanism.

Yet another object of this invention is to provide a low friction push rod seal for brake actuating motors which will not retard operation.

An additional object of this invention is to provide in a fluid pressure motor having a pressure responsive element movable within a casing and a projecting reciprocable push rod, a novel seal comprising relatively slidable telescoped tubes respectively rigid with the casing and push rod to form a tortuous path to the interior of the casing which will effectively prevent water and other foreign matter from entering the casing through the push rod opening.

A further object of the invention is to provide a novel baffle scraper in a push rod seal for a pneumatic motor.

Further objects and advantages will appear from the following description and appended claims when read in conjunction with the attached drawings, wherein:

Figure 4 is an enlarged view partly in section of the brake actuating motor of Figure 2 showing the details of the baffle type seal in the brake applied position;

Figure 5 is a fragmentary top plan view substantially the same as Figure 1 showing a brake actuating diaphragm motor; and Figure 6 is a fragmentary side elevational view of the brake actuating motor of Figure 5 showing the mounting of the motor and the baffles of the seal.

Figures 1, 2, 3:
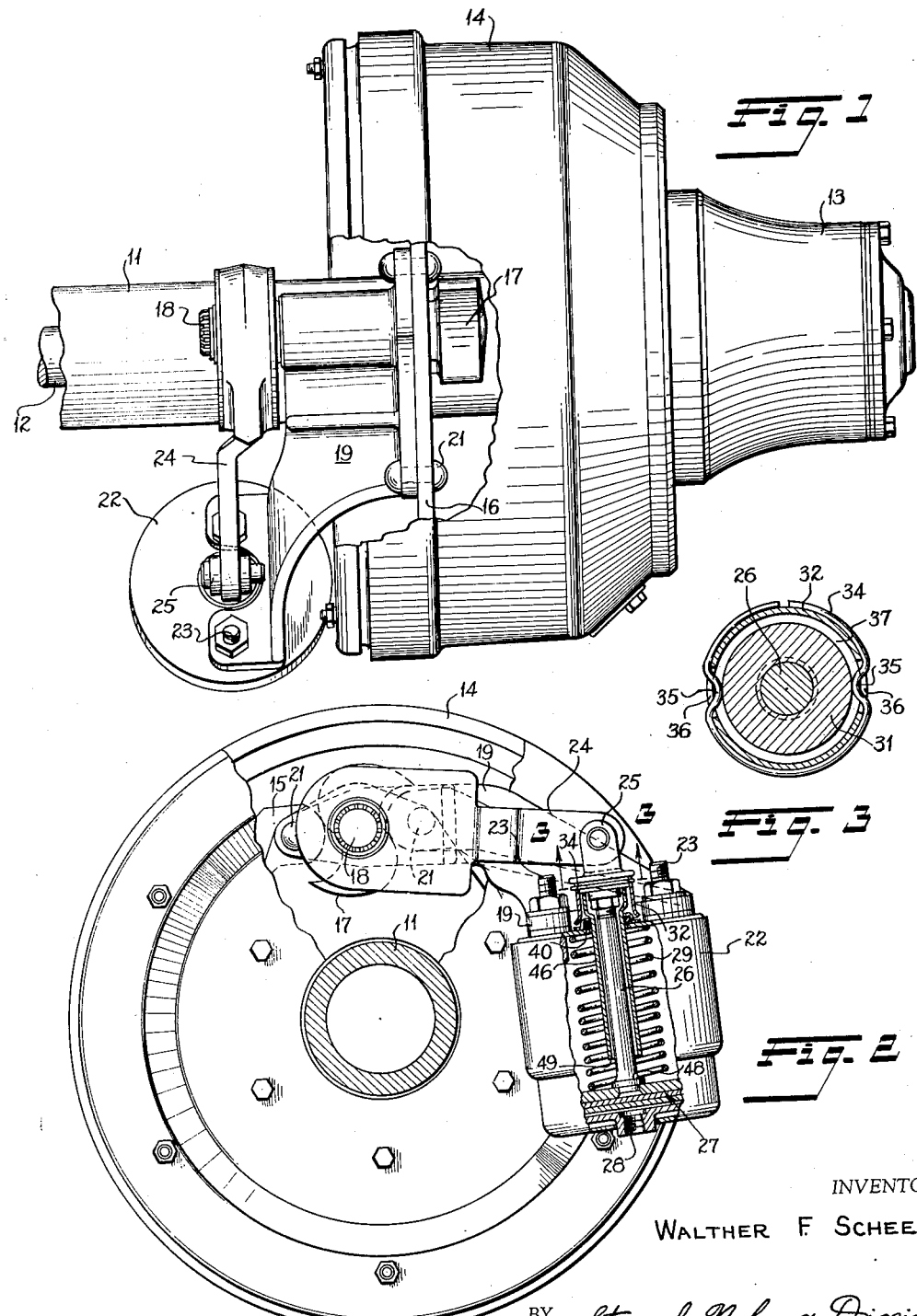
Figure 1 is a fragmentary top plan view partly broken away and in section showing a piston-type brake actuating motor installation according to a preferred embodiment of the invention.
Figure 2 is an end elevational view of the brake and actuating mechanism of Figure 1, partially broken away and in section showing the mounting of the motor.
Figure 3 is an enlarged section taken substantially along the line 3—3 of Figure 2.

Figure 1 illustrates the outer end of a representative vehicle drive axle 11. An axle shaft 12 extends through the housing of axle 11 and is secured at its outer end to a wheel hub 13 that has bolted thereto a brake drum 14. Brake shoes 15 (Figure 2) are pivotally mounted on the brake mechanism support plate 16 and are moved about suitable pivots into braking engagement with drum 14 by a cam 17 rigidly mounted on and for rotation with a cam shaft 18.

A suitable mounting bracket 19 is secured to the brake mechanism support plate 16 as by rivets 21. Motor casing 22 is removably secured to bracket 19 as by studs 23 and is disposed with its axis almost vertical, as shown in Figure 2. A lever 24 is splined at one end to cam shaft 18 and at the other end is pivotally connected to a yoke 25 fixed upon the end of push rod 26 of the motor.

Referring to Figure 2 which shows the parts in brake retracted position and Figure 4 which shows the parts in brake applied position, the motor casing 22 contains a chamber in which reciprocates a piston 27 fixed upon the end of push rod 26. Fluid under pressure is admitted through a port 28 to displace piston 27 against the force of a coiled compression spring 29 within the chamber when the brake shoes are to be applied to the drum.

Outside the motor casing yoke 25 is formed with a cylindrical shank section 31 on which is snugly fitted a short baffle tube 32 that seats with its upper end against a shoulder 33 on the yoke. Baffle tube 32 is fixed on the yoke by a snap ring 34 having a plurality of inturned lips 35 extending through openings 36 in the collar to be disposed in an annular surface groove 37 in shank section 31 (Figure 3). Tube 32 is preferably provided at its lower end with an outwardly flared flange 38. Tube 32 thus moves at all times with push rod 26.

The top wall of motor casing 22 is apertured at 39 to permit free clear passage of the reciprocable push rod 26 and baffle tube 46. A resilient rubber annulus 40 of normally circular cross-section, usually called an O-ring, is mounted on the top wall 41 of the casing in surrounding relation to opening 39. O-ring 40 is held on the casing wall by an annular sheet metal cup-shaped retainer 42 which has a flange 43 suitably secured to wall 41 as by welding.

The upper wall 44 of retainer 42 not only prevents movement of the O-ring away from casing 22 but it also provides a stationary annular internal edge 45 for a purpose to be described.

A longitudinally shiftable baffle tube 46 which is much longer than baffle tube 32 is mounted on casing 22, primarily by O-ring 40. The inner diameter of O-ring 40 is slightly less than the outer diameter of the cylindrical surface 47 of tube 46 so that when tube 46 is pushed through the O-ring it is peripherally engaged thereby tightly enough to provide a fluid tight seal between surface 47 and the O-ring, but which permits free reciprocation of tube 46 during operation.

When tube 46 is mounted in the assembly O-ring 40 is radially compressed between surface 47 and the side wall of the retainer cup, but it is preferably not compressed axially of tube 46 and may even expand or displace slightly in that direction. The diameter of circular edge 45 is such that the edge is as close as possible to surface 47 so as to function to scrape mud and like material from surface 47 during reciprocation of tube 46. The diameter of surface 47 is such as to pass cleanly through opening 39, and the inner diameter of tube 46 is such as to freely clear push rod 26 except as will now be described.

Adjacent piston 27, push rod 26 is formed with an enlarged radial shoulder 48 which when the parts are in the brake relaxed position of Figure 1 is longitudinally spaced from the lower end 49 of tube 46. In that position the upper end 51 of tube 46 may abut against a radial shoulder 52 provided by the yoke shank section 31. At its upper end tube 46 is enlarged to provide a short cylindrical section 53 that approaches the inner diameter of tube 32 to form therewith a more efficient baffle.

In operation, starting with the parts in the position of Figure 2, fluid pressure applied through port 28 causes piston 27 to displace upwardly thereby moving push rod 26 upwardly to rock lever 24 to rotate the cam shaft 18 and cam 17.

During initial movement of push rod 26 it moves longitudinally relative to tube 46. Then, by the time the tubes 32 and 46 have become axially relatively displaced to the position shown in Figure 4, the lower end of tube 46 is abutted by shoulder 48, and during further movement of the push rod in the same direction tubes 32 and 46 retain the same relative position one to the other. It will be noted that the axial separation of the tubes is not enough to move tube end 51 past flange 38, so that the baffle tubes 46 and 32 remain in telescoped relation at all times.

After tube 46 is picked up by shoulder 48, it travels with the push rod, surface 47 sliding cleanly through the retained O-ring 40 without destroying the fluid tight seal provided by retainer 42, O-ring 40 and surface 47. Figure 4 shows the parts at what may be the brake applied position with the piston 27 approximately midway in the motor and spring 29 half compressed.

When the brake fluid pressure is relaxed spring 29 tends to return the piston and the parts to the Figure 2 position, aided of course by the brake shoe return spring (not shown).

During the initial return movement of push rod 26 shoulder 48 leaves the end of tube 46 and the rod moves relative to tube 46 until tube upper end 51 is abutted by shoulder 52, the tubes 32 and 46 then being in their most completely telescoped position of Figure 2, which position they retain until the parts are all back in the positions shown in Figure 2. Edge 45 scrapes surface 47 clean when tube 46 thus slides inward relative to the motor casing. The sliding seal of the O-ring affords protection from foreign matter which may get by edge 45.

The light weight of tube 46, the scraping contact of edge 45 and the O-ring sealing contact do not materially impede reciprocation of tube 46 during the above-described operations. As shown in Figures 2 and 4, during most of the time tube 46 is pressure sealed in fluid tight relation on either shoulder 48 or shoulder 52 whereby the baffle assembly positively prevents entry of foreign material into the interior of casing 22. If desired soft rubber washers may be provided on shoulders 48 and 52 to increase the efficiency of the pressure seal. The clearance between tube section 53 and tube 32 may be made as small as desired, a free sliding fit being the essential requirement.

Figures 5 and 6 illustrate another embodiment of the invention wherein cam shaft 18 is journalled at one end in a bracket 54 secured to the axle housing flange as by rivets 55. The other end of shaft 18 is journalled within the outer end of a tubular support 56 secured to bracket 54 as by studs 57, and a diaphragm motor 58 is mounted, as by studs 59, on a bracket 61 secured to the outer end of support 56 as by bolts 62.

Lever 24 is splined on the outer end of shaft 18 and is pivotally connected at 63 to a yoke 64 on the upper end of push rod 65 which is like push rod 26 of the first embodiment.

A flexible diaphragm 66 has its outer periphery suitably clamped between the halves of the casing 58 in a conventional manner and is centrally clamped between an enlarged shoulder 67 and a nut 68 threaded on the lower end of rod 65. A coiled compression spring 69 biases diaphragm 66 toward the brake relaxed position of Figure 6.

Yoke 64 is formed with cylindrical shank section 71 on which a short baffle tube 72 is secured as by a snap ring 34 and groove assembly like that of Figure 3. As illustrated in Figure 6 tube 72 is of enlarged cross-section where it is telescoped with the end of tube 46 which is mounted on O-ring 40 on the casing of motor 58 exactly as illustrated in Figure 4. This provides a flat radial shoulder 73 adapted to be abutted by the upper end 51 of tube 46 in the Figure 6 position of the parts. The other end 49 of tube 46 abuts shoulder 67 when the motor diaphragm moves a predetermined amount to the left in Figure 6 and thereafter telescoped tubes 46 and 72 move together until the stroke is ended.

The operation of the embodiment shown in Figures 5 and 6 is the same as in Figures 1–4, and the end 51 of tube 46 never leaves the confines of tube 72, so that even when the push rod 65 reaches the end of the brake engaging stroke corresponding to Figure 4 the tubes 46 and 72 remain telescoped and partially coextensive axially.

The baffle tubes in both embodiments are constantly in telescoped relation throughout the operation of the mechanism. This telescoped relation of the baffles defines a tortuous path to the interior of the diaphragm which by virtue of its labyrinthian configuration provides an effective seal to the admission of foreign substances to the interior of the motor, since any foreign substances in order to enter the motor must first pass upwardly, against the force of gravity, between the enlarged tube portions over the end 51 of tube 46 and then downwardly along the push rod. Further the essentially vertical mounting of the motor aids in the operation of the baffle seal since the motor housing is between the baffle and the road and is of considerably larger diameter than the baffle. Thus foreign substances are prevented from being thrown directly up into the baffle tubes by the position of the motor housing and must enter the baffle indirectly. Additionally the baffle seal of the present invention, unlike some of the seals known in the art, has no exteriorly exposed flexing parts that are susceptible to cracking or rupturing due to constant flexing and its operation is independent of weather. The foregoing seal has a minimum of relatively rubbing parts and is constructed of metal tubular members to have a useful life at least equivalent to that of the motor mechanism.

Preferably the brake motor is mounted anywhere between a substantially vertical disposition of the push rod as in Figure 2, and a position where the push rod is mounted at about 30° to the vertical as shown in Figure 6. This is a range of possible mountings through which the baffle seal is equally effective.

From the foregoing it will be seen that I have invented a relatively simple, inexpensive and novel baffle seal particularly adaptable for use on brake actuating mechanisms which effectively protects the actuating mechanisms from the operational hazards of flying debris and splashing liquids and which has an operational life equivalent to the life of the mechanism itself.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An actuating mechanism comprising a housing having an opening therein, an element reciprocably mounted in said housing, a fluid inlet in said housing for admitting fluid pressure to one side of said element for moving said element in one direction, resilient means disposed on the other side of said element for moving said element in an opposite direction, a shaft operatively connected to said element and extending through said opening exteriorly of said housing adapted to be moved by said element, and a pair of relatively movable telescoped members mounted in said opening and on said shaft, respectively, defining with said shaft a labyrinth between the exterior and interior of said housing whereby entrance of foreign substances into said housing is effectively retarded.

2. An actuating mechanism comprising a housing having an opening therein, an element reciprocably mounted in said housing, a fluid inlet in said housing for admitting fluid pressure to one side of said element for moving said element in one direction, resilient means disposed on the other side of said element for moving said element in an opposite direction, a shaft operatively connected to said element and extending through said opening exteriorly of said housing adapted to be moved by said element, a first member mounted in said opening in spaced surrounding relation to said shaft, and a second member mounted on said shaft exteriorly of said housing in spaced surrounding relation with said first member whereby said first and second members and said shaft define a labyrinth from the exterior to the interior of said housing effectively inhibiting the admission of foreign substances to the interior of said housing.

3. An actuating mechanism comprising a housing having an opening therein, an element reciprocably mounted in said housing, a fluid inlet in said housing for admitting fluid pressure to one side of said element for moving said element in one direction, a compression spring operatively disposed on the other side of said element and energized by movement of said element in the first direction for moving said element in an opposite direction, a shaft operatively connected to said element and extending through said opening exteriorly of said housing adapted to be moved by said element, an annular member fixedly mounted on said housing adjacent said opening and defining with said housing an annular recess, a resilient annulus mounted in said recess, a first tubular member slidably mounted on said housing in spaced surrounding relation to said shaft and being supported essentially by said resilient annulus, and a second tubular member mounted on and movable with said shaft exteriorly of said housing in constantly telescoped relation with said first member in all operative positions of said shaft whereby said first and second tubular members and said shaft define an open tortuous passage from the exterior to the interior of said housing effectively inhibiting the admission of foreign substances to the interior of said housing.

4. The mechanism recited in claim 3 wherein means is provided on said shaft for engaging and longitudinally sliding said first tubular member during reciprocation of said shaft and said annular member is provided with an edge closely surrounding the periphery of said first tubular member whereby said edge scrapes foreign particles from said first tubular member during said reciprocation of said first tubular member.

5. In a fluid pressure actuated motor, a casing, a fluid pressure responsive element in said casing, a reciprocable rod operatively connected to said element within the casing and projecting through an opening in the casing, a first tubular baffle member mounted on said rod outside the casing, and a second tubular baffle member mounted on said casing in surrounding relation to said opening and said rod and having an end telescoped with said first baffle member in all operative positions of said rod.

6. In a fluid pressure actuated motor, a casing, a fluid pressure responsive element in said casing, a reciprocable rod operatively connected to said element within the casing and projecting through an opening in the casing, a first tubular baffle member fixed on said rod outside the casing, an annular fluid tight seal on said casing surrounding said opening and a second tubular baffle member mounted on said seal in surrounding relation to said rod and having a portion telescoped with said first baffle member in all operative positions of said rod.

7. In a fluid pressure actuated motor, a casing, a fluid pressure responsive element in said casing, a reciprocable rod operatively connected to said element within the casing and projecting through an opening in the casing, a first tubular baffle member fixed on said rod outside the casing, a second tubular baffle member slidably mounted on said casing in surrounding relation to said opening and said rod and having an end telescoped with said first baffle member in all operative positions of said rod, and means on said rod for engaging said second tubular baffle member to shift it relative to the casing during reciprocation of said rod.

8. In the motor defined in claim 7, a relatively stationary scraper on said casing closely surrounding the periphery of said second tubular member.

9. In a fluid pressure actuated motor, a casing, a fluid pressure responsive element in said casing, a reciprocable rod operatively connected to said element within the casing and projecting through an opening in the casing, a first tubular baffle member fixed on said rod outside the casing, a resilient sealing annulus on said casing surrounding said opening, and a second tubular baffle member surrounding said rod longitudinally slidably mounted on said annulus in radially spaced relation to the edge of said opening and to said rod and having an end telescoped with said first tubular member in all operative positions of said rod.

10. In the motor defined in claim 9, a retainer for said annulus secured to said casing and an annular edge on said retainer closely surrounding the outer periphery of said second baffle member so as to provide a scraper therefor.

11. In a fluid pressure actuated motor, a casing, a fluid pressure responsive element in said casing, a reciprocable rod operatively connected to said element within the casing and projecting through an opening in the casing, a first tubular baffle member fixed on said rod outside the casing, a second tubular baffle member longitudinally slidably mounted on said casing and surrounding said rod and having an end telescoped with said first baffle member in all operative positions of said rod, fluid tight sealing means between said second baffle member and the casing, and means on said rod spaced apart a distance greater than the length of said second tubular baffle member for picking up said second tubular baffle member to travel with the rod for part of the distance the rod moves in each direction.

12. In a fluid pressure actuated motor, a casing, a fluid pressure responsive element in said casing, a reciprocable rod operatively connected to said element within the casing and projecting through an opening in the casing, a first tubular baffle member fixed on said rod outside the casing, a resilient O-ring seal mounted on said casing in surrounding relation to said opening, a second tubular baffle member slidably mounted in said O-ring and having opposite ends inside and outside the casing, and means on said rod inside and outside the casing respectively spaced apart a distance greater than the effective length of said second tubular baffle member for picking up said second tubular baffle member to travel with the rod for at least part of the distance the rod moves in each direction.

References Cited in the file of this patent

UNITED STATES PATENTS

| | | |
|---|---|---|
| 747,772 | Rickman | Dec. 22, 1903 |
| 772,842 | Spencer et al. | Oct. 18, 1904 |
| 1,164,371 | Lovejoy | Dec. 14, 1915 |
| 1,312,649 | Turner | Aug. 12, 1919 |
| 2,247,374 | Hawley | July 1, 1941 |
| 2,259,589 | Schleicher | Oct. 21, 1941 |
| 2,280,341 | Mott | Apr. 21, 1942 |
| 2,303,699 | Main | Dec. 1, 1942 |
| 2,354,831 | Rike | Aug. 1, 1944 |
| 2,629,463 | Freeman | Feb. 24, 1953 |